D. P. LEACH.
Corn Planter.
No. 88,048. Patented March 23, 1869.
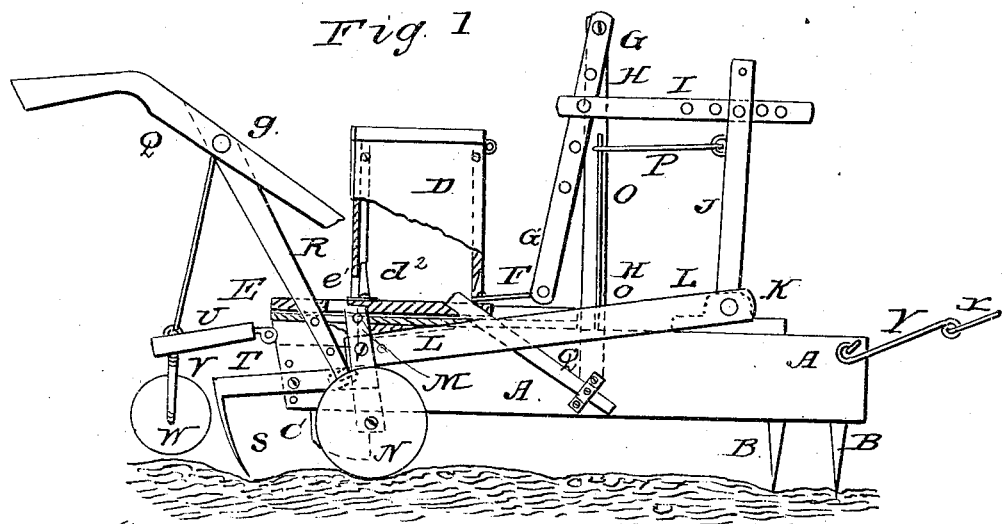
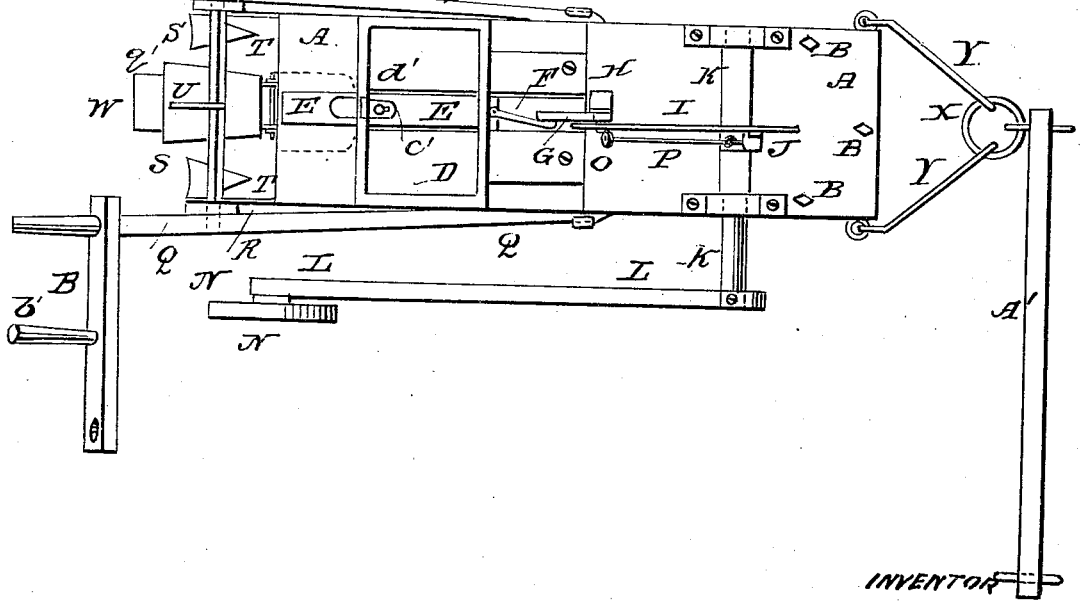
WITNESSES
Joh. Becker
Wm A. Morgan
INVENTOR
D P Leach,
PER.
Munn & Co
attorneys

DANIEL P. LEACH, OF FRANKLIN, INDIANA.

Letters Patent No. 88,048, dated March 23, 1869.

IMPROVEMENT IN CORN-PLANTER.

The Schedule referred to in these Letters Patent and making part of the same.

*To all whom it may concern:*

Be it known that I, DANIEL P. LEACH, of Franklin, in the county of Johnson, and State of Indiana, have invented a new and improved Corn-Planter; and I do hereby declare that the following is a full, clear, and exact description thereof, which will enable others skilled in the art to make and use the same, reference being had to the accompanying drawings, forming part of this specification, in which—

Figure 1 is a side view of my improved corn-planter, part being broken away to show the construction.

Figure 2 is a top or plan view of the same.

Similar letters of reference indicate corresponding parts.

My invention has for its object to furnish a simple, cheap, effective, and accurate corn-planter, which shall be so constructed and arranged that it may be easily adjusted to do its work, as the circumstances of the case may require; and It consists in the construction and combination of the various parts of the machine, as hereinafter more fully described.

A is the body, or foundation of the machine, which may be a solid stick of timber, of the required length and breadth, or a strong and heavy frame, as may be desired or convenient.

To the forward end of the body A is attached a number of harrow, or cultivator-teeth, B, by which the ground, in which the seed is to be planted, is cultivated, or stirred up, so that the seed may be dropped in and covered with loose soil.

To the rear part of the body A is attached a double mould-board, or furrowing-plow, C, by which the ground is opened to receive the seed.

D is the seed-box, which is placed upon the rear part of the body A, just in front of the plow C.

E is a slide, passing through the lower part of the seed-box D, longitudinally with the body A, upon which it slides back and forth. The slide E has a hole formed through it, which receives the corn from the seed-box, and carries it to the rear of the said seed-box D, where it drops through a hole in the body A, in the rear of the furrowing-plow C. The size of the hole in the slide E is regulated, according to the size of the kernels, or the number desired for a hill, by the small slide $e'$, attached to the slide E by a screw passing through a slot in the said slide $e'$, and into the slide E.

$d^1$ is an adjustable bar, having a brush, $d^2$, attached to its lower end, and which is attached to the rear side of the seed-box D, in such a position that the brush $d^2$ may rest upon the slide E, and prevent any more kernels than enough to exactly fill the hole in the slide E, from being carried out by said slide.

To the forward end of the slide E is pivoted the rear end of the short connecting-rod F, the forward end of which is pivoted to the lower end of the swinging bar, or lever G, the upper end of which is pivoted to the side of the upper end of the standard H, the lower end of which is securely attached to the body A of the machine.

I is a lever, the rear end of which is pivoted to one or the other of the holes through the lever H, according to the length of movement which it is desired the slide E should have.

The forward end of the lever or bar I is adjustably pivoted to the upper part of the arm or lever J, by a bolt passing through one or the other of the holes in the said bar I, and through one or the other of the holes through the said arm J, so that the connection of the said bar and arm may be adjusted to give the necessary movement to the slide E, with a greater or less movement of the arm J, as the circumstances of the case may require.

The lower end of the arm J is rigidly attached to the rock-shaft K, which works in bearings attached to the body, or frame A, and to the end of which rigidly attached the forward end of the bar L.

M is a standard to an axle, formed upon, or attached to the lower end of which is pivoted the wheel N.

The upper part of the standard M is adjustably attached to the rear part of the bar L, so that the slide E may be operated to drop the corn, by the wheel N dropping into the cross-furrows, the said slide E being drawn back into the seed-box D by the rise of the wheel N out of the said furrows, the wheel being adjusted, according to the depth of the furrows, by adjusting the attachment of the standard M to the bar L.

O is a spring, the lower end of which is securely attached to the body, or frame A, and its upper end is connected with the upper part of the arm J by the connecting-rod P, to insure the prompt action of the slide E, as the wheel N drops into and rises out of the cross-furrows.

Q are the handles, the forward ends of which are attached to the sides of the middle part of the body, or frame A, and the rear parts of which are connected to each other by a cross-bar, or round, $q'$, in the ordinary manner.

The rear ends of the handles Q are adjustably supported in place, so that they may be raised or lowered, to adjust their height to the height of the operator, by the brace-bars R, the upper ends of which are pivoted to the handles Q, or to the cross-bar $q'$, and the lower ends of which are pivoted to the sides of the rear part of the body A, by screws or bolts passing into the said body through one or the other of the holes in the lower parts of the said braces.

S are the covering-plows, which are formed upon, or attached to the rear ends of the bars T, the forward ends of which are pivoted to the sides of the body A by screws, or bolts passing through the ends of the said bars T, and into the said body A.

The bars T are adjustably secured in place, so that the plows S may run at any desired depth, by screws or bolts passing through the said bars T, and into one or the other of the holes formed in the sides of the rear part of the body A for their reception.

U is a platform, the forward edge of which is pivoted or hinged to the rear end of the body A, and to the under side of the rear end of which are attached standards, V, to the lower ends of which is pivoted the roller W, by which the soil is pressed down upon the seed.

The downward pressure of the roller W is regulated by placing weight, more or less, upon the platform U.

X is the draught-ring, which is connected with the sides of the forward end of the body A, by the bars or links Y, so that the machine may be drawn straight forward.

When it is desired to plant two rows of corn at a time, two single machines are used, which are connected to each other, at their forward ends, by the double-tree, or draught-bar A', and at their rear ends by the bar B'.

The double-tree A' is made with two hooks upon each end, one upon the forward and the other upon the rear side of the said ends. The rear hooks are hooked into the draught-rings X, and to the forward hooks the draught is applied.

The bar B' is made with a hole in each end, to receive the adjacent handles of the two machines. The bar B', at its middle point, is provided with a rearwardly-projecting handle, b', by means of which the two machines are guided.

In case it is desired to plant the corn without the cross-furrows, the system of levers and bars may be made to operate the slide E, by raising the right-hand handles of the machines. This may be done, when two machines are connected together, by pressing the bar B' to the left.

It will be observed, that by the construction and arrangement, herein described, of the parts by which the dropping slide E is operated, the slide E will be kept constantly in motion in the seed-box D, by the wheel N passing over clods, or other obstructions upon the ground, between the furrows, so that the hole in the slide E will be always exactly filled, and consequently will each time drop exactly the same number of kernels.

Having thus described my invention,

I claim as new, and desire to secure by Letters Patent—

The combination of the slide E e', connecting-bar F, swinging lever G, adjustable connecting-bar I, arm J, rack-shaft K, bar, L, adjustable standard M, and wheel N, with each other, and with the seed-box D d', and body, or frame A, substantially as herein shown and described, and for the purpose set forth.

DANIEL P. LEACH.

Witnesses:
EDW'D N. WOOLLEN,
WM. H. BARNETT.